(12) United States Patent
Levene et al.

(10) Patent No.: US 8,338,790 B2
(45) Date of Patent: Dec. 25, 2012

(54) RADIATION-SENSITIVE DETECTOR WITH A SCINTILLATOR IN A COMPOSITE RESIN

(75) Inventors: Simha Levene, D. N. Hanegev (IL); Cornelis R. Ronda, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 331 days.

(21) Appl. No.: 12/746,801

(22) PCT Filed: Dec. 12, 2008

(86) PCT No.: PCT/IB2008/055276
§ 371 (c)(1),
(2), (4) Date: Jun. 8, 2010

(87) PCT Pub. No.: WO2009/083852
PCT Pub. Date: Jul. 9, 2009

(65) Prior Publication Data
US 2010/0264322 A1  Oct. 21, 2010

Related U.S. Application Data

(60) Provisional application No. 61/015,887, filed on Dec. 21, 2007.

(51) Int. Cl.
*G01T 1/20* (2006.01)
(52) U.S. Cl. ........................................ 250/367
(58) Field of Classification Search ............ 252/301.36, 252/301.17, 301.4 R, 301.4 H, 301.4 F, 301.4 S
See application file for complete search history.

(56) References Cited

U.S. PATENT DOCUMENTS

| | | | |
|---|---|---|---|
| 4,375,423 A | 3/1983 | Cusano et al. | |
| 6,429,437 B1 * | 8/2002 | Laugier | 250/370.11 |
| 6,630,077 B2 | 10/2003 | Shiang et al. | |
| 7,282,713 B2 | 10/2007 | Jiang et al. | |
| 7,304,309 B2 * | 12/2007 | Suhami | 250/370.11 |
| 2002/0079455 A1* | 6/2002 | Wieczorek | 250/367 |
| 2005/0040366 A1 | 2/2005 | Yagi et al. | |
| 2006/0226370 A1 | 10/2006 | Gia et al. | |

FOREIGN PATENT DOCUMENTS

| CN | 1715230 B | 3/2012 |
|---|---|---|
| EP | 1006374 A2 | 6/2000 |
| WO | 2007075983 A2 | 7/2007 |

OTHER PUBLICATIONS

Cherepy, N. J., et al.; Cerium-doped single crystal and transparent ceramic lutetium aluminum garnet scintillators; 2007; Nuclear Instruments and Methods in Physics Research; A 579:38-41.

* cited by examiner

*Primary Examiner* — David Porta
*Assistant Examiner* — Hugh H Maupin

(57) ABSTRACT

A radiation-sensitive detector includes a photosensor elements (122) and a scintillator (116) optically coupled to the photosensor element (122). The scintillator (116) includes a powdered scintillator and a resin mixed with the powdered scintillator. The refractive index mismatch between the powdered scintillator and the resin is less than 7%. In one non-limiting instance, the composite scintillator material may be used to form fiber optic leaves arranged as a high-resolution detector array in conventional or spectral CT.

29 Claims, 5 Drawing Sheets

RADIATION-SENSITIVE DETECTOR WITH A SCINTILLATOR IN A COMPOSITE RESIN

CROSS REFERENCE TO RELATED APPLICATIONS

Figure 1:
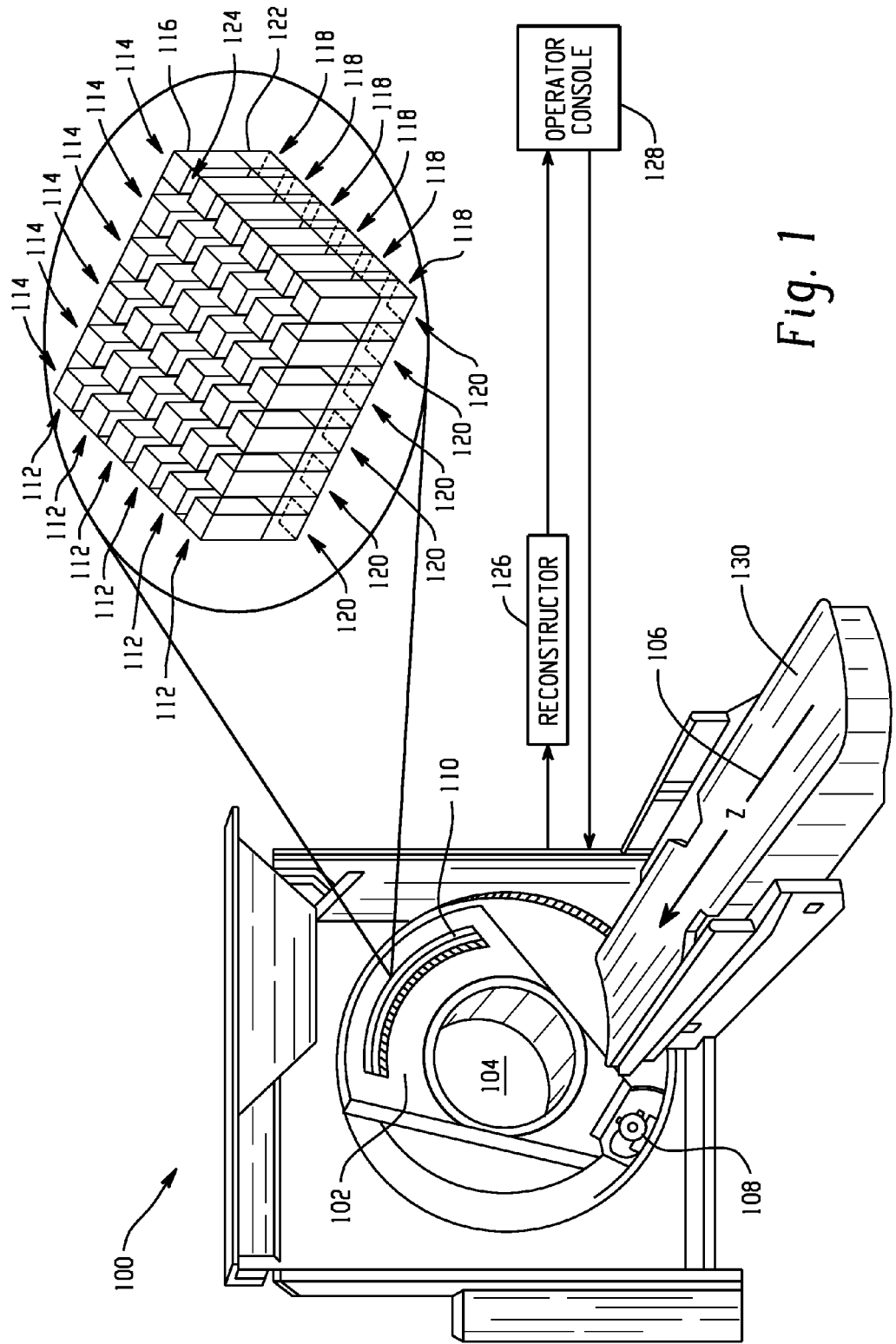

This application claims the benefit of U.S. provisional application Ser. No. 61/015,887 filed Dec. 21, 2007, which is incorporated herein by reference.

The present application generally relates to radiation-sensitive detectors. While it is described with particular application to a computer tomography (CT) system, it also relates to other medical and non-medical imaging applications.

A computed tomography (CT) system includes a source of ionizing radiation, which rotates about and emits radiation that traverses an examination region, and a radiation-sensitive detector which detects the radiation that traverses the examination region. Such a detector array may include a two-dimensional radiation sensing detector array with a plurality of rows and columns of dixels (detector elements). Each dixel includes a scintillator element, which produces light stimulated by absorption of the x-rays, and is optically coupled to a corresponding element of a photosensor array. The scintillator elements receive the ionizing radiation and produce light indicative thereof, and the photosensors receive the light and produce electrical signals indicative thereof. The signals are reconstructed to generate volumetric image data indicative of the examination region. The volumetric image data may be processed to generate one or more images indicative of the examination region.

Conventionally, scintillators can be made by sintering scintillator powder or by crystallization at high temperatures and pressures. Unfortunately, these processes can be delicate and expensive, and produce brittle scintillators requiring tedious structuring to form an array of scintillators pixels for a radiation sensitive detector.

Techniques that do not include sintering and crystallization can also be used. By way of example, Pham Gia et al. (U.S. Pat. No. 7,265,357 B2, filed Nov. 22, 2005) discloses a scintillator which includes a mixture of powdered gadolinium oxysulfide ($Gd_2O_2S$, or GOS) and a paraffin wax. Unfortunately, GOS has a refractive index (n) of about 2.2 and the paraffin wax has a refractive index of about 1.4 to 1.6. Consequently, the refractive index mismatch between these two materials is greater than 27%, which may result in a relatively large amount of scatter at the particle boundaries, thereby reducing light efficiency.

Pham Gia et al. disclose that is would be preferable if the polymer had a refractive index of greater than 1.7. To this end, Pham Gia et al. mix nanoparticulate titanium dioxide ($TiO_2$), between 0.5% to 2.0%, with the paraffin wax to increase the refractive index of the polymer. Adding 2.0% $TiO_2$ to the paraffin wax may increase the refractive index of the polymer and may reduce the refractive index mismatch between GOS and the polymer so that the mismatch may be no greater than 25%. However, such a mismatch may still result in a relatively large amount of scatter at the particle boundaries, reducing light efficiency. Adding additional $TiO_2$ may result in increased scatter and haze.

Aspects of the present application address the above-referenced matters and others.

According to one aspect, a radiation-sensitive detector includes a photosensor element and a scintillator optically coupled to the photosensor element. The scintillator includes a powdered scintillator and a resin mixed with the powdered scintillator. The refractive index mismatch between the powdered scintillator and the resin is less than seven percent (7%).

In another aspect, a medical imaging system includes a radiation source that emits radiation that traverses an examination region and a detector array that detects radiation that traverses the examination region. The detector array includes a plurality of photosensor elements and a scintillator optically coupled to the plurality of photosensor elements. The scintillator includes a powdered scintillator and a resin mixed with the powdered scintillator. The refractive index mismatch between the powdered scintillator and the resin is less than ten percent (10%).

In another aspect, a radiation sensitive detector includes a fiber optic leaf form with a composite scintillator material that includes a scintillator powder embedded in a resin of matching refractive index. In one such embodiment fiber optic leaves are oriented perpendicularly to incident x-ray radiation to detect the incident x-ray radiation with high spectral resolution. In a second embodiment the said leaves are oriented parallel to the incident x-ray radiation to detect the incident x-ray radiation with high spatial resolution.

Still further aspects of the present invention will be appreciated by those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Figure 2:
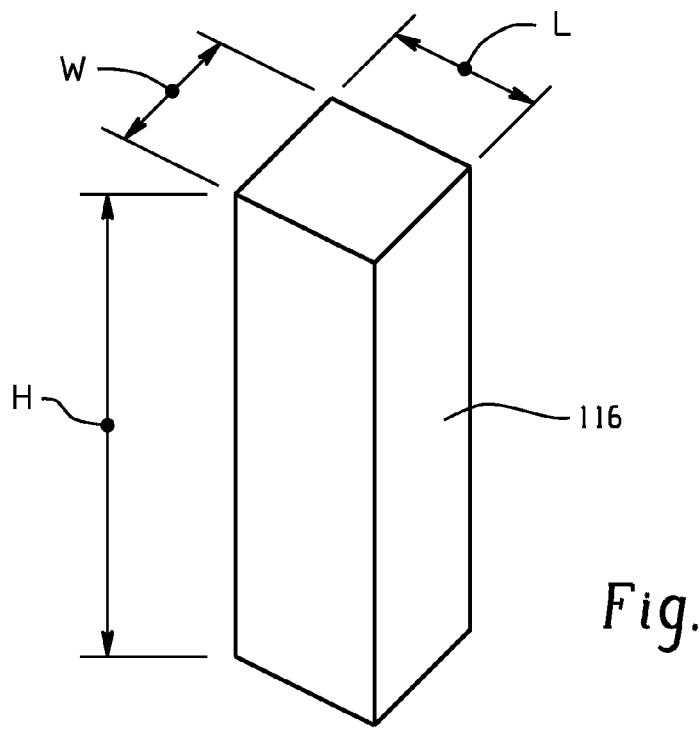
Figure 3:
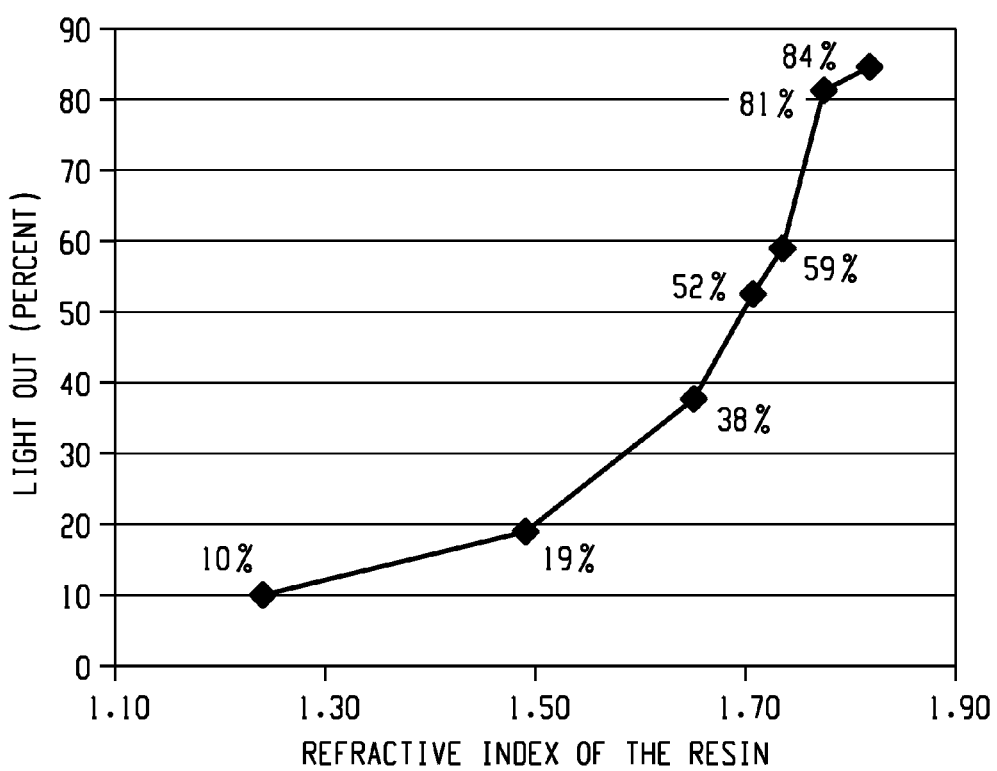
Figure 4:
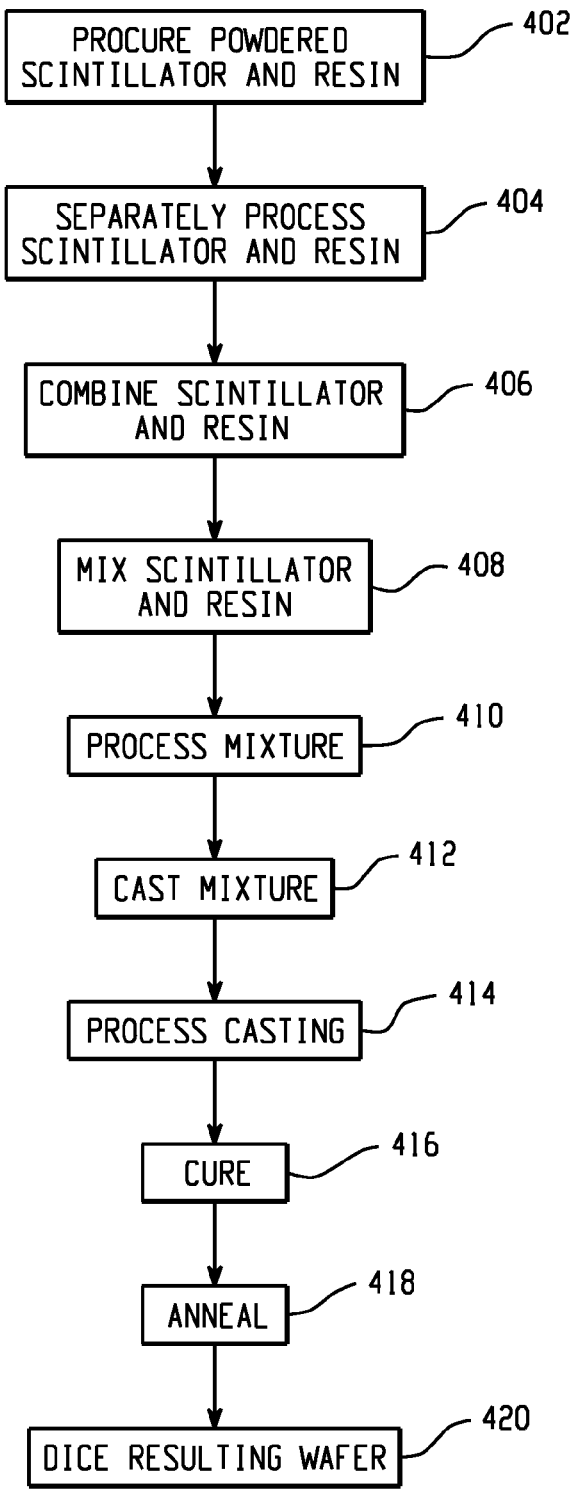
Figure 5:
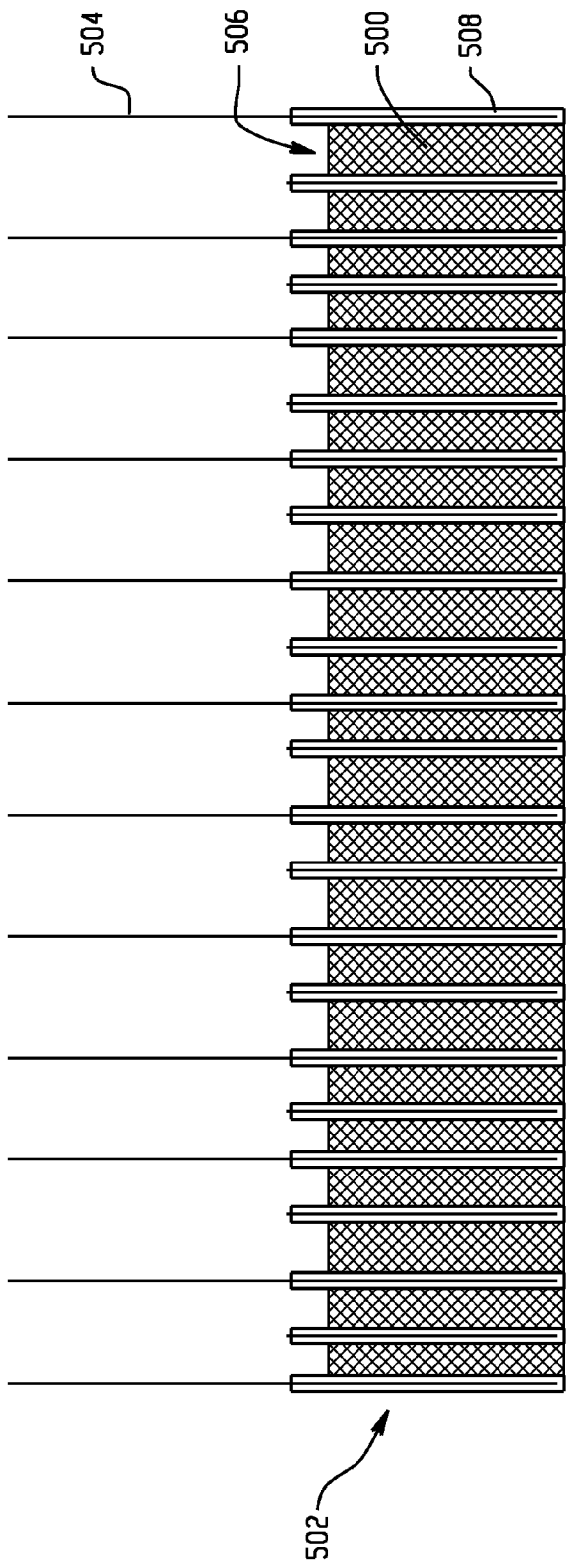
Figure 6:
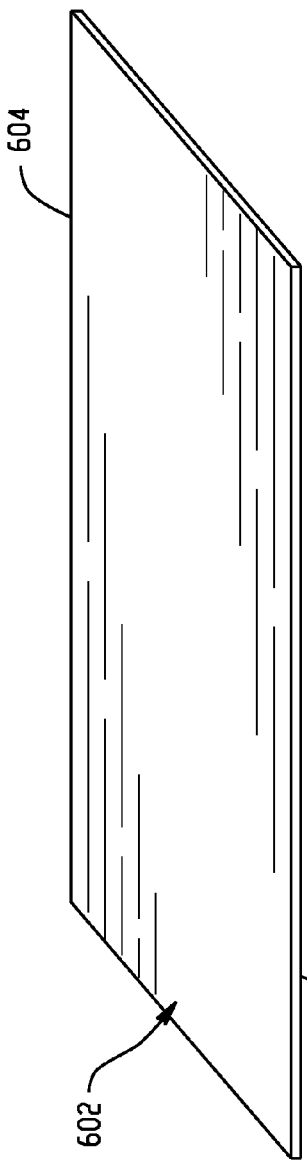
Figure 7:
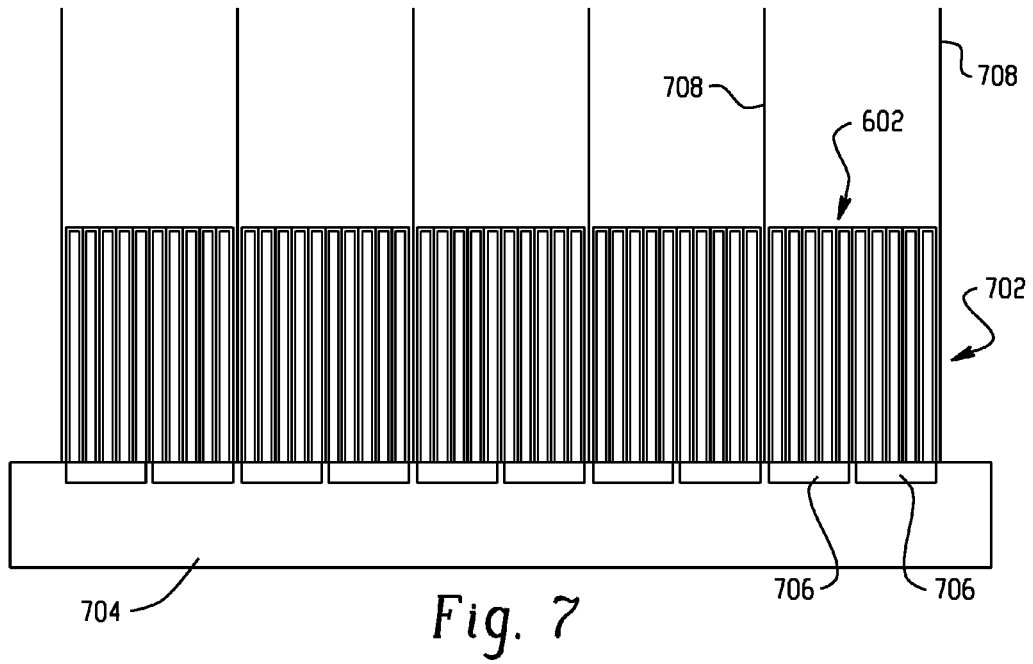
Figure 8:
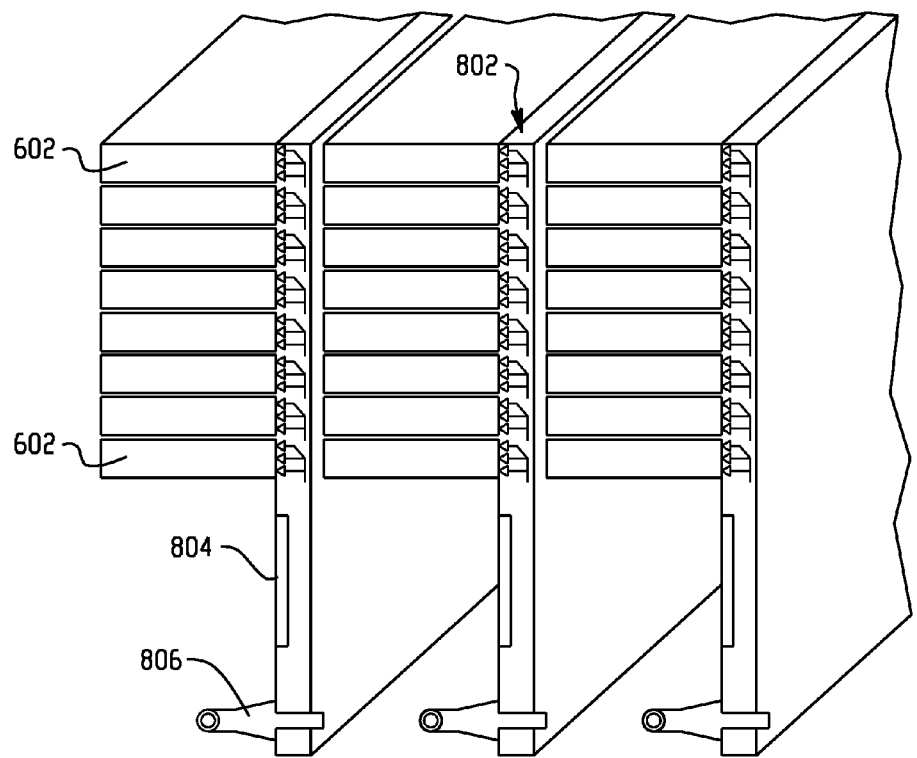

FIG. 1 illustrates an example imaging system.
FIG. 2 illustrates an example scintillator pixel.
FIG. 3 illustrates a graph of dixel light efficiency.
FIG. 4 illustrates an example method.
FIG. 5 illustrates an example scintillator.
FIG. 6 illustrates an example scintillator wafer.
FIG. 7 illustrates an example scintillator in connection with an array of coupled photosensors having high spatial resolution.
FIG. 8 illustrates an example multi-layer spectral CT scintillator with coupled photosensors.

With reference to FIG. 1, a computed tomography (CT) system 100 includes a rotating gantry portion 102 which rotates about an examination region 104 around a longitudinal or z-axis 106. The rotating gantry portion 102 supports an x-ray source 108, such as an x-ray tube, that generates and emits radiation that traverses the examination region 104.

A radiation-sensitive detector array 110 detects radiation emitted by the source 108 for a plurality of projection angles or views so that projections are obtained over at least one hundred and eighty (180) degrees plus a fan angle. The detector array 110 generates a signal or projection data indicative of the detected radiation. It is to be appreciated that the detector array 110 can be an integrating detector that integrates an electrical current or voltage, which is indicative of the detected radiation, over an integration period, or a counting detector that energy-resolves detected photons via two or more energy windows.

The illustrated detector array 110 includes a plurality of rows 112 and columns 114 of scintillator pixels 116 that are coupled to corresponding rows 118 and columns 120 of photosensor elements 122. A filler 124 resides at least between the scintillator pixels 116. In one non-limiting example, the detector array 110 may include sixteen (16) rows of sixteen (16) dixels, including scintillator pixels 116 and corresponding photosensor elements 122, rendering a detector array 110 with two-hundred and fifty-six (256) dixels. Other numbers of dixels are also contemplated. In addition, a single scintillator pixel can be employed with a plurality of photosensor elements, or vice versa.

The radiation strikes the scintillator pixels 116, which produce light indicative thereof, and the light is received by the photosensors 122. The photosensors 122, which may includes photodiodes, photoelements, or the like, each produce a signal indicative of the light received from a corresponding scintillator pixel 116. It is to be appreciated that the number, size, shape, spacing between, etc. of the scintillator pixels 116 and the photosensor dixels 122 in the illustrated detector array 110 are provided for explanatory purposes and are not limiting.

As described in greater detail below, the scintillator pixels 116 include a composite material such as a powdered scintillator/resin mixture in which the powdered scintillator and the resin have a substantially matched refractive index, thereby the composite has a relatively higher light efficiency relative to mixtures with a greater refractive index mismatch. For example, the refractive index mismatch may be less than ten percent (10%) such as less than seven percent (7%), and the light efficiency may be over fifty percent (50%). Such a composite may be formed by dispersing the powdered scintillator in the resin without sintering the powder or forming large crystals by crystallization.

A reconstructor 126 reconstructs the projection data generated by the detector array 110 to generate volumetric image data. The volumetric image data is indicative of objects within the examination region 104.

A computer serves as an operator console 128. The console 128 includes a human readable output device such as a monitor or display and an input device such as a keyboard and mouse. Software resident on the console allows the operator to control and interact with the scanner 100, for example, through a graphical user interface (GUI).

An object support 130 such as a couch supports a patient or other object in the examination region 104. The object support 130 is movable so as to guide the object within respect to the examination region 104 while performing a scanning procedure.

FIG. 2 shows an example scintillator element 116. The illustrated scintillator element 116 has a height "H" of about three (3) millimeters (mm), a width "W" of about one (1) mm, and a length "L" of about one (1) mm. The illustrated scintillator element 116 includes a composite of a powered scintillator and a resin such as an epi-sulfide or a poly epi-sulfide. The composite includes about seventy (70) percent by weight of a suitable scintillator. Examples of a suitable scintillator includes mono-crystalline LYSO ($Lu_{1.8}Y_{0.2}SiO_5:Ce_x$) or LSO ($Ce_{2x}Lu_{2(1-x)}SiO_5$) as discussed in U.S. Pat. No. 4,958,080. Examples of suitable epi-sulfides include the epi-sulfides discussed in U.S. Pat. No. 6,534,589. The powered scintillator has a refractive index (n) of about 1.81, and the resin has a refractive index of about 1.71. As such, the refractive index mismatch is about five and a half percent (5.5%). The light output efficiency for the illustrated scintillator element 116 is greater than fifty (50) percent. That is to say, more than fifty (50) percent of the optical photons emitted by scintillation from the powder emerge from the base of the scintillator element for collection by the photo-sensor. FIG. 3 depicts a graph showing light output efficiency for a dixel of this geometry including a mixture of LYSO (n=1.81) and a resin, as a function of the refractive index of the resin.

FIG. 4 illustrates an example method for forming the illustrated scintillator elements 116. At 402, a suitable quantity of resin and powdered scintillator are obtained. In one example, this includes obtaining about two and half (2.5) grams (g) of the resin and about one and a half (1.5) g of LYSO powder. At 404, the resin and powdered scintillator are then processed. By way of example, the powered scintillator and the resin are degassed. This may include separately degassing the powered scintillator and the resin at room temperature (about twenty (20) degrees Celsius) under vacuum with a pressure less than three hundred (300) torr. At 406, after about thirty (30) minutes or more of degassing, the powdered scintillator is added to the resin. In one instance, the powdered scintillator is added to the resin under vacuum.

At 408, the powdered scintillator and resin are mixed. In one instance, the powdered scintillator and resin are mixed using a rotary ball mill, for example, overnight, or using a high-speed centrifugal mixer such as Synergy Devices Speedmixer for several minutes. At 410, the mixture is processed. By way of example, the mixture may be degassed for two (2) hours at room temperature under vacuum of 300 torr or greater as discussed in U.S. Pat. No. 6,531,532. At 412, the mixture is cast into a glass, a polytetrafluoroethylene (PTFE), another synthetic fluoropolymer, or other material mold corresponding to a desired size wafer. At 414, the mixture is processed. For example, the mixture may be heated for about fifteen (15) minutes at thirty (30) degrees Celsius under vacuum.

At 416, the mixture is then cured for about forty-eight (48) hours at ninety (90) degrees Celsius. At 418, the wafer is annealed by cooling at a rate of twenty (20) degrees Celsius per hour to room temperature to form a scintillator wafer. In one example, the wafer may be about eighteen (18) mm wide by twenty-five (25) mm long by three and a half (3.5) mm high. At 420, the wafer is diced using a precision rotary saw or the like to form scintillator elements of a suitable size. For example, in one instance the resulting elements 116 are about three (3) mm (H) by one (1) mm (W) by one (1) mm (L), as show in FIG. 2. In another example, the resulting dixels are about one and a half (1.5) mm by one (1) mm by one (1) mm. Each dixel may absorb about ninety-eight percent (98%) of incident radiation. Other sizes are also contemplated. The gaps between the scintillator elements may be filled using a reflective underfill compound such as a compound that includes micro-particulate (0.3μ) titanium dioxide ($TiO_2$) in an epoxy resin.

Variations are discussed.

In another embodiment, a wetting agent such as a surfactant, including, but not limited to a stearic acid, oleic or fatty acid, aminamides and the like may be added to the powdered scintillator/resin mixture, which may assist dispersion of the powdered scintillator in the resin.

Additionally, a reducing agent such as $LiAlH_4$, $NaBH_4$ can be included in the powdered scintillator/resin mixture to mitigate coloration that may occur due to radiation induced formation of small molecules such as $H_2O$, HCl or the like in the scintillator.

In the examples discussed above, the powered scintillator included LYSO. In another embodiment, Lu may be partially or wholly replaced by Scandium (Sc), which may result in a less dense scintillator material. In one instance, the resulting scintillator material may have lower refractive index relative to LYSO, and may improve light collection efficiency.

In other embodiments, other scintillator materials are contemplated. For example, one or more of the following materials may be additionally or alternately used: thallium-doped caesium iodide (CsI (Tl)) (n=1.79), thallium-doped sodium iodide (NaI(Tl)) (n=1.85), sodium-doped caesium iodide (CsI (Na)) (n=1.84), other alkali halides, LSO, garnets (general formulas $X_3Y_2(ZO_4)_3$ in which X is a twovalent and Z and fourvalent metal ion or $X_3Y_2(ZO_4)_3$ in which all metal ions are three valent (~1.7<n<~1.9) and/or other scintillator materials. Although CsI (Tl) is hygroscopic, and thus of restricted use in its monocrystalline form, it can be incorporated into a composite material whereby the resin seals it off, rendering it inaccessible to attack by atmospheric moisture.

Examples of suitable garnets include, but are not limited to, garnets doped with $Ce_{3+}$ or $Pr_{3+}$, which in general are fast emitters in that they have decay times less than one hundred (100) nanosecond (ns), such as $Y_3Al_5O_{12}$:Ce, $Lu_3Al_5O_{12}$:Ce, $Gd_3Al_5O_{12}$:Ce, $(Lu,Y,Gd)_3Al_5O_{12}$:Ce, $(Lu,Y,Gd)_3Ga_5O_{12}$:Ce, $(Lu,Y,Gd)_3(Al,Ga)_5O_{12}$:Ce, $Ca_3Sc_2Si_3O_{12}$:Ce, $(Ca)_3(Sc,Al)_2Si_3O_{12}$:Ce, $Y_3(Sc,Al)_5O_{12}$:Ce, $Lu_3(Sc,Al)_5O_{12}$:Ce, $(Lu,Y)_3(Sc,Al)_5O_{12}$:Ce, $(Lu,Y)_3(Sc,Al,Ga)_5O_{12}$:Ce, $Y_3Al_5O_{12}$:Pr, $Lu_3Al_5O_{12}$:Pr, $(Lu,Y)_3Al_5O_{12}$:Pr, and garnets doped with $Nd^{3+}$ or $Er^{3+}$.

Other suitable compounds include compounds of a lanthanide (Ln=Sc, Y, La, Gd, Lu) like $LnI_3$:Ce, $LnBr_3$:Ce, $LnCl_3$:Ce, $Ln_2SiO_5$:Ce, $Ln_2Si_2O_7$:Ce, $RbLn_2Br_7$:Ce, $M_2LnH_5$:Ce (M=Li, Na, K, Cs, Rb and H=F, Cl); Other suitable compounds include corresponding $Pr_{3+}$ doped materials. Other suitable compounds include other materials like SrS:Ce or CaS:Ce, which, in addition, can be coated with a thin conformal protective coating such as $Al_2O_3$, $SiO_2$ or the like, and the same host lattices and host lattice coating combinations doped with $Eu^{2+}$. Other suitable powdered scintillators include an activator ion with an emission decay time of less than ten (10) microns (µs). Suitable activator ions include, but are not limited, to $Ce^{3+}$, $Nd^{3+}$, $Pr^{3+}$, $Eu^{2+}$, $Er^{3+}$, $Tl^+$. In addition, the powdered scintillator may include a thin conformal protective coating.

In other embodiments, other resins are contemplated. For example, in another embodiment the resin includes an epi-sulfide such as the one discussed in U.S. Pat. No. 6,534,589 B1. In another embodiment, the resin includes an epi-sulfide such as the Essilor epi-sulfide discussed in U.S. Pat. No. 6,891,017. In another embodiment, the resin includes an epoxy with an additive such as the one discussed in U.S. Pat. No. 7,274,024 B2. In another embodiment, the resin includes a polymer comprising sulfur such as the one discussed in U.S. Pat. No. 7,091,307 B2. In another embodiment, the resin includes a poly carbodiimide such as the one discussed in U.S. publication 2006/0022356 A17.

FIG. 5 illustrates an embodiment in which a scintillator composite 500, such as the scintillator composite described above, is used in connection with a scintillator array 502 with an anti-scatter grid 504. The anti-scatter grid 504 includes anti-scatter plates, which may be formed from relatively thin-section of metal. In the illustrated example, the scintillator composite 500 is cast into the interstices 506 between separators 508 before polymerization. The separators 508 may be coated with a reflective material such as a thin layer of white paint or other reflective material. Such layer may be applied via a dipping process. Alternately, they may be plated with aluminum, silver, or another bright metal coating.

FIG. 6 illustrates an embodiment in which a scintillator composite, such as the scintillator composite described above, is used to form "scintillating fiber optic" fibers, leaves, or sheets 602. In this example, the scintillator composite is first cast, rolled or extruded to form thin sheets 602, for example, one hundred (100) microns thick before polymerization. The sheets 602 may be coated with a film 604 of low refractive index (e.g., n=1.4). Such film 604 may be less than two (2) microns thick. The film may be applied by dipping, evaporation, or other technique to provide "fluorescent fiber optic" leaf elements.

FIG. 7 illustrates an embodiment in which the sheets 602 are used in connection with a scintillator array 702 coupled to a photodiode array 704. As shown, in this example the sheets 602 are positioned above photodiodes 706. Ten (10) coated sheets 602, each about ninety (90) microns thick, are positioned between grid plates 708, with sets of five (5) sheets being aligned over corresponding photodiodes 706. Such a scintillator configuration can feed light into each half (0.5) mm wide photodiode. If, in this embodiment of a High Definition CT scanner, the active areas of the photodiodes 706 are made sufficiently small, the resolution of the CT scanner is limited only by focal spot size. In an alternate embodiment, digital photon-counting elements may alternatively be used. In this case, on-chip switches may be used to separate the channels at high count rates.

FIG. 8 illustrates an embodiment in which the sheets 602 are used in a Spectral CT configuration. In FIG. 8 the x-rays are incident downwardly from the top of the figure, in which a plurality of sheets 602 are aligned parallel to each other and perpendicularly to a direction of the impinging radiation. In this configuration, the sheets 602 deliver an optical output laterally into rows of photodiodes, which may be analogue or digital. More particularly, incident radiation is absorbed in a series of say thirty composite scintillator leaves 602 each, for example, one hundred (100) micron thick stacked vertically to achieve the required stopping power. The fluorescent light emitted is constrained by the "fiber" optics to funnel sideways into the sensitive areas of an array of photodiodes 802, which may each be 100 microns high or more.

In an illustrated embodiment for use in spectral CT, the photodiodes 802 are multi-pixel photon counting arrays, triggered to Geiger avalanche action by individual incident photons. The resulting signals are processed by pulse counting circuitry 804 and output through read out electronics 806. The stacked deck geometry provides sufficient area for a large number of diodes opposite each scintillator, which provides a wide dynamic range (max counting rate/min counting rate). In one embodiment, the lateral projected optical path within each scintillator sheet 602 is one (1) mm or less, permitting a substantial degree of refractive index mismatch between the powder and the plastic matrix resin without substantial light loss.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

Having thus described the preferred embodiments, the invention is now claimed to be:

1. A radiation-sensitive detector, comprising:
    a photosensor element; and
    a scintillator optically coupled to the photosensor element, wherein the scintillator includes a plurality of fiber optic leaves that funnel emitted light to the photodiode element, the scintillator including:
        a powdered scintillator; and
        a resin mixed with the powdered scintillator, wherein a refractive index mismatch between the powdered scintillator and the resin is less than 7%.

2. The detector of claim 1, wherein the powdered scintillator includes LYSO or LSO.

3. The detector of claim 2, wherein the resin has a refractive index of about 1.71.

4. The detector of claim 2, wherein the resin includes one of a polyepi-sulfide, a sulfur based polymer, or a poly-carbodiimide.

5. The detector of claim 2, wherein the resin includes a plastic matrix.

6. The detector of claim 1, wherein the powered scintillator includes a material from a group consisting of: CsI (Tl); NaI (Tl); and CsI (Na).

7. The detector of claim 1, wherein the powered scintillator includes a material from a group consisting of: $Gd_3Al_5O_{12}$:Ce, $(Lu,Y,Gd)_3Al_5O_{12}$:Ce, $(Lu,Y,Gd_3)Ga_5O_{12}$:Ce, $(Lu,Y,Gd)_3(Al,Ga)_5O_{12}$:Ce, $Ca_3Sc_2Si_3O_{12}$:Ce, $(Ca)_3(Sc,Al)_2Si_3O_{12}$:Ce, $Y_3(Sc,Al)_5O_{12}$:Ce, $Lu_3(Sc,Al)_5O_{12}$:Ce, $(Lu,Y)_3(Sc,Al)_5O_{12}$:Ce, $(Lu,Y)_3(Sc,Al,Ga)_5O_{12}$:Ce, $Y_3Al_5O_{12}$:Pr, $Lu_3Al_5O_{12}$:Pr, and $(Lu,Y)_3Al_5O_{12}$:Pr.

8. The detector of claim 1, wherein the powered scintillator includes a material from a group consisting of a garnet doped with $Nd^{3+}$ and a garnet doped with $Er^{3+}$.

9. The detector of claim 1, wherein the powdered scintillator includes a material from a group consisting of: $LnI_3$:Ce, $LnBr_3$:Ce, $LnCl_3$:Ce, $Ln_2SiO_5$:Ce, $Ln_2Si_2O_7$:Ce, $RbLn_2Br_7$:Ce, $M_2LnH_5$:Ce and corresponding salts doped with $Pr^{3+}$.

10. The detector of claim 1, wherein the powdered scintillator includes a material from a group consisting of: SrS:Ce, SrS:Ce coated with $Al_2O_3$, SrS:Ce coated with $SiO_2$, CaS:Ce, CaS:Ce coated with $Al_2O_3$, and CaS:Ce coated with $SiO_2$ and the same host lattices and host lattice coating combinations doped with $Eu^{2+}$.

11. The detector of claim 1, wherein the scintillator includes a plurality of scintillator pixels in which each scintillator pixel corresponds to one of the plurality of photosensor elements.

12. The detector of claim 1, wherein the plurality of fiber optic leaves includes a composite fluorescent material, stacked parallel to the incident radiation, and funnels emitted light downwardly to the photodiode element.

13. The detector of claim 1, wherein the plurality of fiber optic leaves includes a composite fluorescent material, stacked perpendicular to the incident radiation, and funnels emitted light laterally to the photodiode element.

14. A medical imaging system, comprising:
a radiation source that emits radiation that traverses an examination region;
a detector array that detects radiation that traverses the examination region, the detector array including:
a plurality of photosensor elements; and
a scintillator optically coupled to the plurality of photosensor elements, wherein the scintillator includes an array of fiber optic leaves, the scintillator including:
a powdered scintillator; and
a resin mixed with the powdered scintillator, wherein a refractive index mismatch between the powdered scintillator and the resin is less than 10%.

15. The system of claim 14, wherein both the powdered scintillator and the resin have refractive indexes between about 1.7 and about 1.9 at the wavelength of the emitted radiation.

16. The system of claim 14, wherein the powdered scintillator includes an activator ion with an emission decay time of less than 10 nanoseconds.

17. The system of claim 16, wherein the activator ion is one of $Ce^{3+}$, $Nd^{3+}$, $Pr^{3+}$, $Eu^{2+}$, $Er^{3+}$, $Tl^+$.

18. The system of claim 14, wherein the powdered scintillator includes a thin conformal protective coating.

19. The system of claim 14, wherein the powdered scintillator includes LYSO and the resin includes at least one of an epi-sulfide, a poly-carbodiimide, or a sulfur based polymer.

20. The system of claim 14, wherein the array of fiber optic leaves includes a composite fluorescent material and are arranged parallel to each other and perpendicular to the incident radiation.

21. The system of claim 14, wherein the refractive index mismatch is less than 5.5%.

22. A radiation sensitive detector, comprising:
a first fiber optic leaf, including:
a composite scintillator material with a scintillator powder embedded in a resin of matching refractive index, wherein the first fiber optic leaf is oriented perpendicularly to incident x-ray radiation and detects the incident x-ray radiation.

23. The radiation sensitive detector of claim 22, further including at least a second fiber optic leaf, wherein the first and second fiber optic leaves are stacked parallel to each other.

24. The radiation sensitive detector of claim 22, wherein light emitted in the first optical leaf traverses the leaf in a lateral direction towards an element of a photodiode array.

25. A radiation sensitive detector, comprising:
a first fiber optic leaf, including:
a composite scintillator material with a scintillator powder embedded in a resin of matching refractive index, wherein the first fiber optic leaf is oriented parallel to incident x-ray radiation and detects the incident x-ray radiation.

26. The radiation sensitive detector of claim 25, further including at least a second fiber optic leaf, wherein the first and the second fiber optic leaves are stacked parallel to each other.

27. The radiation sensitive detector of claim 25, wherein light emitted in the first optical leaf traverses the first optical leaf in a lateral direction towards an element of a photodiode array.

28. A radiation-sensitive detector, comprising:
a photosensor element; and
a scintillator optically coupled to the photosensor element, the scintillator including:
a powdered scintillator, wherein the powered scintillator includes a material from a group consisting of a garnet doped with $Nd^{3+}$ and a garnet doped with $Er^{3+}$; and
a resin mixed with the powdered scintillator, wherein a refractive index mismatch between the powdered scintillator and the resin is less than 7%.

29. A radiation-sensitive detector, comprising:
a photosensor element; and
a scintillator optically coupled to the photosensor element, the scintillator including:
a powdered scintillator, wherein the powdered scintillator includes a material from a group consisting of: SrS:Ce, SrS:Ce coated with $Al_2O_3$, SrS:Ce coated with $SiO_2$,
CaS:Ce, CaS:Ce coated with $Al_2O_3$, and CaS:Ce coated with $SiO_2$ and the same host lattices and host lattice coating combinations doped with $Eu^{2+}$; and
a resin mixed with the powdered scintillator, wherein a refractive index mismatch between the powdered scintillator and the resin is less than 7%.

* * * * *